US009705853B2

(12) United States Patent
Vanore et al.

(10) Patent No.: US 9,705,853 B2
(45) Date of Patent: Jul. 11, 2017

(54) METHOD TO DETECT AN OTA (OVER THE AIR) STANDARD MESSAGE AFFECTED BY AN ERROR

(71) Applicant: STMICROELECTRONICS S.r.l, Agrate Brianza (IT)

(72) Inventors: Agostino Vanore, San Marco Evangelista (IT); Vitantonio Distasio, Caserta (IT)

(73) Assignee: STMICOELECTRONICS S.R.L., Agrate Brianza (MB) (IT)

( * ) Notice: Subject to any disclaimer, the term of this patent is extended or adjusted under 35 U.S.C. 154(b) by 9 days.

(21) Appl. No.: 14/524,132

(22) Filed: Oct. 27, 2014

(65) Prior Publication Data
US 2015/0124967 A1 May 7, 2015

(30) Foreign Application Priority Data
Nov. 4, 2013 (IT) .............................. MI2013A1824

(51) Int. Cl.
| | |
|---|---|
| *H04L 29/06* | (2006.01) |
| *H04W 12/10* | (2009.01) |
| *H04W 12/08* | (2009.01) |
| *H04L 9/14* | (2006.01) |
| *H04W 4/00* | (2009.01) |

(Continued)

(52) U.S. Cl.
CPC ............ *H04L 63/0435* (2013.01); *H04L 9/14* (2013.01); *H04W 4/001* (2013.01); *H04W 4/003* (2013.01); *H04W 12/04* (2013.01); *H04W 12/08* (2013.01); *H04W 12/10* (2013.01); *H04L 63/123* (2013.01); *H04L 63/1475* (2013.01);

(Continued)

(58) Field of Classification Search
CPC ............. H04L 63/0435; H04L 63/123; H04L 63/1475; H04L 9/14; H04L 2209/20; H04L 2209/34; H04L 2209/80; H04W 4/001; H04W 4/003; H04W 12/04; H04W 12/08; H04W 12/10; H04W 12/12
USPC ......................................... 713/168; 380/270
See application file for complete search history.

(56) References Cited

U.S. PATENT DOCUMENTS 5,832,083 A * 11/1998 Iwayama .............. H04L 9/0822
380/239
7,221,660 B1 * 5/2007 Simonson ............... H04L 12/18
370/312

(Continued)

OTHER PUBLICATIONS

"Smart Cards; Secured packet structure for UICC based applications (Release 11)", Technical Specification, European Telecommunications Standards Institute (ETSI), vol. SCP TEC, No. V11.0.0, Mar. 2012, pp. 1-22.

(Continued)

*Primary Examiner* — Sarah Su
(74) *Attorney, Agent, or Firm* — Slater Matsil, LLP

(57) ABSTRACT

A method is to detect a message compatible with the OTA (Over The Air) standard and affected by a wrong ciphering. The method may include receiving the ciphered OTA message; deciphering the OTA message; and reading a counter field of padding bytes in the deciphered OTA message and reading corresponding padding bytes in the OTA message deciphered. The method may also include detecting at least one bit in at least one of the padding bytes of the OTA message deciphered, with the at least one bit being indicative of the wrong ciphering.

23 Claims, 2 Drawing Sheets

(51) Int. Cl.
*H04W 12/04* (2009.01)
*H04W 12/12* (2009.01)

(52) U.S. Cl.
CPC ...... *H04L 2209/20* (2013.01); *H04L 2209/34* (2013.01); *H04L 2209/80* (2013.01); *H04W 12/12* (2013.01)

(56) References Cited

U.S. PATENT DOCUMENTS

| | | | | |
|---|---|---|---|---|
| 2003/0188247 | A1* | 10/2003 | Ahmed | H03M 13/6356 714/755 |
| 2006/0154695 | A1* | 7/2006 | Ishibashi | H04L 63/0869 455/558 |
| 2007/0091886 | A1* | 4/2007 | Davis | H04W 28/06 370/389 |
| 2007/0140259 | A1* | 6/2007 | Mouffron | H04L 1/0061 370/395.32 |
| 2009/0055893 | A1* | 2/2009 | Manessis | G06Q 20/04 726/2 |
| 2009/0138948 | A1* | 5/2009 | Calamera | H04L 9/3234 726/6 |
| 2009/0222708 | A1* | 9/2009 | Yamaga | G06F 11/1068 714/773 |
| 2010/0332933 | A1 | 12/2010 | Kubota | |
| 2011/0103445 | A1* | 5/2011 | Jax | H04N 19/30 375/224 |
| 2014/0372758 | A1* | 12/2014 | Agiwal | H04W 12/02 713/170 |

OTHER PUBLICATIONS

Kent et al., "IP encapsulating security payload (ESP), rfc2406.txt", Nov. 1998, pp. 1-23.
Research in Motion UK, "(U)Sim application toolkit attack", 3GPP TSG SA WG3 Security-SA3#67, May 2012, pp. 1-3.

* cited by examiner

Fig. 1 (PRIOR ART)

| CPI | CPL | CHI | CHL | SPI | KIc | KID | TAR | CNTR | PCNTR | RC/CC/DS | Secured Data with Padding |
|---|---|---|---|---|---|---|---|---|---|---|---|
| | Note 3 | | Note 3 | Note 2 | Note 2 | Note 2 | Note 2 | Note 1 | Note 1 | Note 1 | Note 1 |
| | | | | | | | | Note 2 | Note 2 | | Note 2 |

NOTE 1: These fields are included in the data to be ciphered if ciphering is indicated in the Security Header.
NOTE 2: These fields are included in the calculation of the RC/CC/DS.
NOTE 3: Part or all of these fields may also be included in the calculation of the RC/CC/DS, depending on implementation (e.g. SMS).

METHOD TO DETECT AN OTA (OVER THE AIR) STANDARD MESSAGE AFFECTED BY AN ERROR

TECHNICAL FIELD

The present disclosure refers to a method to detect a message compatible with the OTA standard (Over The Air) and affected by an error. The disclosure also refers to a system implementing the method.

BACKGROUND

In particular, the disclosure refers to a method of the type above mentioned to improve security in wireless transmissions that involve secure electronic devices, such as integrated circuit cards (IC Cards).

Methods are known to detect a message compatible with the OTA standard (Over The Air) and affected by an error. One of these methods, known as checksum, includes summing up all the bits of a message and in storing the resultant value in the same message, before its transmission. After receiving the message, the same sum calculation is implemented and the resultant value is compared with the stored value in the message. If the two values do not correspond, an error is detected.

In the presence of a wrong checksum, a receiving device may return a generic error to a sender device or ask for the retransmission of the message. The error is generic because the checksum does not allow returning to the cause which has determined the different value of the sum before and after the transmission.

The known methods are not able to detect if the OTA message is affected by a specific error, and in particular by a cryptographic error. On the contrary, the response given by the receiving device to an OTA message affected by a cryptographic error may supply information that compromises its security.

For this reason, the sender device may be a hacker which intentionally sends an OTA message affected by wrong or incorrect cryptography, i.e. using a wrong cryptographic key, for analyzing the generic error response of the receiving device and gleaning information therefrom.

In particular, in the field of telecommunication applications (GSM, UMTS, 3GPP2, LTE, etc.), a way to attack an integrated circuit card (IC Card, SIM, USIM, UICC, R-UIM), includes sending to the card an OTA message using a false cryptographic key. The information sent to the card in response to the OTA message may be used to return to the cryptographic key of card.

To understand this better, it is worthwhile observing that, according to the OTA protocol, some information can be encrypted in the message to send through a symmetric key cryptographic algorithm, such as the DES, 3DES, AES algorithms.

Once the OTA message is received and deciphered, the receiving device can verify the authenticity, the correctness and the integrity of the received data. For this purpose, in accordance with the OTA standard, three control modes are considered, mutually exclusive, based on variable size field within the OTA packet. They are known as Cryptographic Checksum, Digital Signature and Redundancy Check.

However, even if the methods represent a valid approach to the integrity and authenticity control of the received data, they may not be able to distinguish the event wherein the OTA message received has been ciphered with a wrong or incorrect key (for example in case of a hacker attack) from the event wherein errors have occurred, such as errors due to interference.

Moreover, according to the OTA standard, usage of the control modes is nonobligatory. Indeed, the transmission of OTA messages without Cryptographic Checksum, Digital Signature and Redundancy Check is common practice, because it accelerates the communication, even if it prevents implementing the controls.

In other words, the ciphering error is not adequately processed by the receiving device that works according to the OTA standard, which may answer sending considerable information, that could allow a hacker to detect the ciphering key of the receiving device.

The technical problem at the base of the present disclosure is to determine a method to detect a message compatible with the OTA standard and affected specifically by an incorrect cryptography, both in the case that the OTA message comprises the optional values of Cryptographic Checksum or Digital Signature or Redundancy Check, and in the case wherein the values are omitted, as optional, allowing therefore the receiving device to implement a countermeasure to a possible attack based on an intentional incorrect cryptography and riding out the limitations which even now affect the known methods.

SUMMARY

The present disclosure is therefore directed to an effective and efficient method to detect messages affected by wrong or incorrect ciphering, in order to make more secure the communication between a secure electronic device and any other electronic sender device and to defend the secure electronic device against a possible hacker attack.

The present disclosure is also directed to realizing a particular state message, that does not contain considerable information or from which it may be possible to go back to the ciphering key of the secure electronic device, and that inform the sender device about the presence of messages affected by incorrect ciphering.

The technical problem are addressed by a method according to the present disclosure, comprising the steps of receiving a ciphered OTA message, deciphering the OTA message received and reading a counter field (PCNTR) of padding bytes and the corresponding padding bytes in the message deciphered. The ciphering error is identified by detecting a value of the counter field (PCNTR) or a value in the padding bytes incongruent with the OTA standard or incongruent with a cryptographic algorithm used for the deciphering.

According to one aspect, the method detects at least one bit 1 in at least one of the padding bytes of the deciphered OTA message come indicative value of the incorrect ciphering.

According to another aspect, the method detects a counter field that does not belong to a preset interval of the cryptographic algorithm, as indicative value of the incorrect ciphering. In one embodiment, the cryptographic algorithm is the DES algorithm or AES and the interval is, respectively, [0 . . . 7] or [0 . . . 15].

According to another aspect, the ciphered OTA message is received by a secure electronic device, comprising a ciphering key for deciphering the OTA message.

In the following description, the expressions secure electronic device or receiving device are used synonymously to indicate the device of which is wanted protection of the cryptographic key, i.e. the device that implements the method according to the present disclosure.

The secure electronic device may comprise an integrated circuit card (IC Card), for example, a SIM, USIM, UICC or R-UIM card.

According to one embodiment, the secure electronic device does not send any message or error code in response to the OTA message affected by incorrect ciphering, to not supply any useful information to a sender device of the OTA message.

According to another embodiment, the secure electronic device sends a message or error code in response to the OTA message affected by incorrect ciphering, but the message or error code is different from others messages of error, for example, from messages of a wrong checksum.

The ciphered OTA message is received by a secure electronic device as an integrated circuit card (IC Card) comprising receiving and deciphering means or a reading and deciphering circuit of the ciphered OTA message, reading means or a reading circuit of the counter field of padding bytes and of the corresponding padding bytes, and detecting means or a detector circuit of a value of the counter field (PCNTR) or of a value in the padding bytes incongruent with the OTA standard or incongruent with a cryptographic algorithm used for the deciphering.

The technical problem is also addressed by the OTA (Over The Air) communication protocol modified to allow the detecting of a message potentially affected by a incorrect ciphering. The protocol modified is characterized by the fact of allowing the reading of a counter field (PCNTR) of padding bytes in an OTA message already deciphered and the reading of a number of padding bytes in the OTA message already deciphered corresponding to the counter field; and the detecting of a value of the counter field (PCNTR) or of a value in the padding bytes incongruent with the OTA standard or incongruent with a cryptographic algorithm used for the deciphering. The incongruent value is indicative of the incorrect ciphering.

BRIEF DESCRIPTION OF THE DRAWINGS

These and other features of the present disclosure will appear clear through the following description, shown by way of example and not limitative, in reference to the attached drawings.

FIG. 1 is a schematic diagram of a message or OTA Command Packet, according to the prior art.

DETAILED DESCRIPTION

Figure 2:
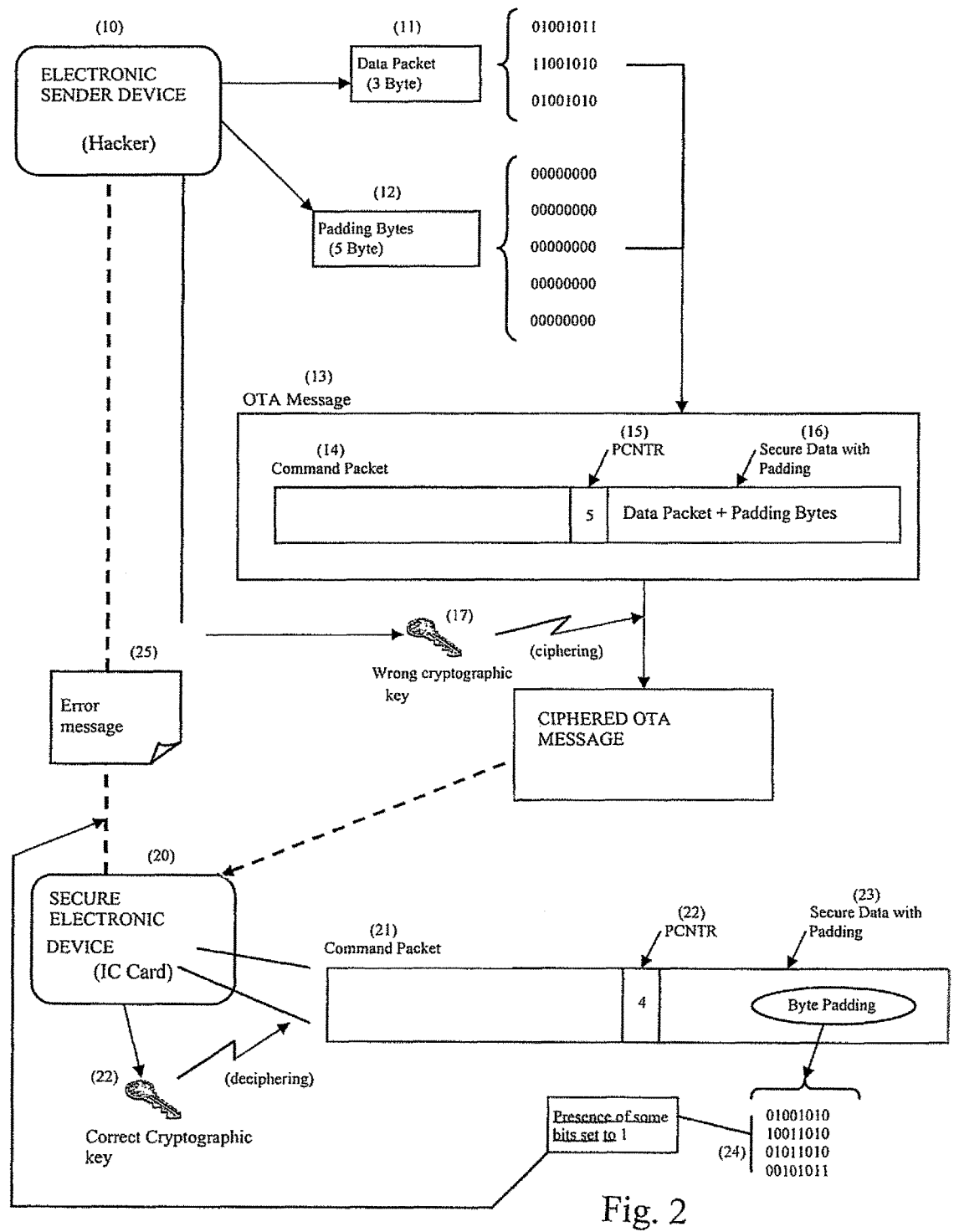
FIG. 2 is a block diagram representative of the method according to the present disclosure.

Now described is a method to detect an incorrect or wrong ciphering in a message compatible with the OTA standard, according to the present disclosure. The method comprises receiving an OTA message in a receiving device, also indicated as a secure electronic device. The OTA message is sent, for example, by an OTA server as sender device, for the updating of an operating system or of an application stored in the secure electronic device. The latter comprises, for example, an integrated circuit card (IC Card).

The OTA message is a Command Packet with a plurality of fields, among which is a counter field of padding bytes (PCNTR) and a secured data field with padding. The counter field stores a value equal to the number of padding bytes present in the secured data field with padding. The latter, according to the OTA standard, have all the bits with a value equal to zero.

The OTA server ciphers the OTA message to send using a cryptographic key equal to the one of the secure electronic device. It is also possible that the sender device is a hacking device, in that case the cryptographic key of the sender device is different from the one of the receiving device, and the OTA message is sent in the attempt to recover from the receiving device valuable information, useful for obtaining its cryptographic key.

Both the electronic devices (sender and receiving) exploit a cryptographic algorithm for the encryption and decryption of the messages, for example, the DES algorithm (Data Encryption Standard) or AES (Advanced Encryption Standard) algorithm.

The interval of possible values of the padding bytes counter depends on the algorithm used. In particular, in the DES algorithm, the secure data field with padding includes a number of bytes being a multiple of 8, whereas, in the AES algorithm, the number of bytes is a multiple of 16. Therefore, the padding bytes counter is included between 0 and 7 for the DES algorithm and is included between 0 and 15 for the AES algorithm.

The sender electronic device produces a data packet of generic length and, depending on the cryptographic algorithm used, adds a number of padding bytes to the secure data field with padding, to make it a multiple of 8 (in case of DES) or 16 (in case of AES). At this point, the sender electronic device encrypts the message with its cryptographic key and sends it.

Once the OTA message is received, the secure electronic device deciphers the messages received with its own cryptographic key and reads the content. In particular, the device accesses the counter field (PCNTR), reads the value and controls the congruence with the padding bytes present in the secure data field with padding.

A congruence check includes verifying that the number of padding bytes in the secure data field with padding, i.e. the number of bytes having all the bits set to 0, corresponds to the number indicated in the padding bytes counter PCNTR. Therefore, if the bits of each padding byte are set to zero, the integrity and the authenticity of the sender device are verified.

Differently, the OTA message is affected by a cryptographic error of a potential hacker that uses a wrong or incorrect key, i.e. different from the one of the receiving device, for ciphering the OTA message.

Another coherence check includes controlling that the number indicated in the padding bytes counter PCNTR is in a predetermined interval, in conformity with the cryptographic algorithm used. For example, in the case of a DES algorithm, a padding byte counter PCNTR with value out of the interval [0 . . . 7] is indicative of a cryptographic error. Therefore, the OTA message is affected by a cryptographic error generated by a potential hacker that uses a incorrect cryptographic key different from the one of the receiving device.

At the end of the above mentioned check, the secure electronic device may implement a security procedure, for example, sending to the sender device a cryptographic error message, being indicative of the incorrect ciphering and without including in the message useful information to return to the correct ciphering key, for example, generic error messages.

In order to render everything even clearer, an example of embodiment of the present disclosure is given hereunder, with reference to FIG. 2.

The sender electronic device 10 produces an OTA data message comprising a data packet 11 of length 3 bytes (n bytes); using, for example, the cryptographic DES algorithm, the sender device adds 5 bytes (8-n bytes) of padding 12 with all the bits set to 0, as expected from the OTA standard, for completing the secured data field with padding 16 of the OTA message 13 and sets to 5 (8-n) the counter field of padding PCNTR 15.

Later, the sender device encrypts the fields of the Command Packet 14 with its cryptographic key 17 and sends the message. The cryptographic key of the sender device, in the example of FIG. 2, is different from that of the receiving device, for example, a wrong or incorrect key.

Once the OTA message is received, the secure electronic device 20 decrypts the ciphered fields of the Command Packet 21. Using its own cryptographic key 32 for the decryption, the secure electronic device obtains numerical results different from those of the sender electronic device, since the two keys are different.

According to the example, the value in the counter field PCNTR 22 of the deciphered OTA message is no more 5 (8-n), but 4 (x); the secure electronic device reads the content of the secure data field with padding 23, and checks the presence of some bits set to 1 in the 4 (x) padding bytes 24. The presence of the bits set to 1 allows the receiving device to detect the message affected by incorrect ciphering and handle the event in an appropriate way, producing an error message 25 for the sender electronic device 10. It is also possible that, due to the different keys used by the sender device and the receiving device, a value y of the padding bytes counter does not belong to the interval [0 . . . 7], after the deciphering of the OTA message among the receiving device. For example, the value of the counter field after the deciphering may be 11, in case of DES algorithm or 23 in case of AES algorithm. Also in this case, the receiving device may detect the message affected by incorrect ciphering and implement a security procedure, for example, producing an error message 25 for the sender electronic device 10 or ignoring the OTA message received.

Advantageously, according to the method of the present disclosure, it is possible to recognize a cryptographic error in an OTA message from errors of different character, for example, from a transmission error of the message.

Profitably, a response of the receiving device in case of incorrect cryptography may be differentiated from a response in case of an error of a different or generic character, as in the error of a checksum. In particular, the receiving device may be programmed to send no information in response to an OTA message affected by a cryptographic error, to not supply any useful information to a possible hacking sender device.

Advantageously, the device may be programmed to answer with specific information of incorrect cryptography, through which the potential hacking sender device could not return to any useful or considerable information of the sender device.

The invention claimed is:

1. A method to detect a message compatible with the Over The Air (OTA) standard and affected by an incorrect ciphering, comprising:
receiving a ciphered OTA message that has been encrypted with a cryptographic algorithm, the ciphered OTA message comprising a counter field of padding bytes and a secured data field with padding bytes, with the counter field having a value equal to a number of padding bytes in the secured data field with padding;
deciphering the received OTA message using the cryptographic algorithm, the deciphered OTA message comprising the counter field of padding bytes and the secured data field with padding bytes;
reading the counter field of padding bytes and the corresponding padding bytes in the deciphered OTA message; and
detecting incorrect ciphering if the value of the counter field is not equal to the number of padding bytes in the secured data field.

2. The method according to claim 1, further comprising detecting at least one bit in at least one of the padding bytes of the deciphered OTA message as indicative of the incorrect ciphering.

3. The method according to claim 1, further comprising detecting the counter field which is not part of an interval defined by the cryptographic algorithm as indicative of the incorrect ciphering.

4. The method according to claim 1, wherein the cryptographic algorithm includes at least one of a DES and AES algorithm.

5. The method according to claim 1, wherein the ciphered OTA message is received by a secure electronic device, comprising a ciphering key to decipher the OTA message.

6. The method according to claim 5, wherein the secure electronic device comprises an IC Card.

7. The method according to claim 5, wherein the secure electronic device does not send at least one of a message and error code in response to the OTA message affected by the incorrect ciphering.

8. The method according to claim 5, wherein the secure electronic device sends at least one of a message and error code in response to the OTA message affected by the incorrect ciphering, the at least one of the message and error code being different from other error messages.

9. The method according to claim 5, wherein the secure electronic device is programmed to implement a security procedure based upon the incorrect ciphering, the security procedure comprising an authentication step of a sender device of the OTA message.

10. A method to detect a message affected by an incorrect ciphering comprising:
receiving a ciphered message that has been encrypted with a cryptographic algorithm, with the ciphered message comprising a counter field of padding bytes and a secured data field with padding bytes, with the counter field having a value equal to a number of padding bytes in the secured data field with padding, and with the cryptographic algorithm including at least one of a DES and AES cryptographic algorithm;
deciphering the received message using the cryptographic algorithm, with the deciphered OTA message comprising the counter field of padding bytes and the secured data field with padding bytes;
reading the counter field of padding bytes and the corresponding padding bytes in the deciphered message; and
detecting incorrect ciphering if the value of the counter field is not equal to the number of padding bytes in the secured data field.

11. The method according to claim 10, further comprising detecting at least one bit in at least one of the padding bytes of the deciphered message as indicative of the incorrect ciphering.

12. The method according to claim 10, further comprising detecting the counter field which is not part of an interval defined by the algorithm as indicative of the incorrect ciphering.

13. The method according to claim 10, wherein the algorithm is compatible with the Over The Air (OTA) standard.

14. The method according to claim 10, wherein the algorithm includes at least one of a DES and AES algorithm.

15. The method according to claim 10, wherein the ciphered message is received by a secure electronic device, comprising a ciphering key to decipher the message.

16. The method according to claim 15, wherein the secure electronic device comprises an IC Card.

17. The method according to claim 15, wherein the secure electronic device is programmed to implement a security procedure based upon the incorrect ciphering, the security procedure comprising an authentication step of a sender device of the message.

18. An electronic device suitable to detect a message affected by an incorrect ciphering, comprising:
- a receiving circuit configured to receive a ciphered message that has been encrypted with a cryptographic algorithm, with the ciphered message comprising a counter field of padding bytes and a secured data field with padding bytes, with the counter field having a value equal to a number of padding bytes in the secured data field with padding;
- a deciphering circuit configured to decipher the received message using the cryptographic algorithm, with the deciphered OTA message comprising the counter field of padding bytes and the secured data field with padding bytes;
- a reading circuit configured to read the counter field of padding bytes and the corresponding padding bytes in the deciphered message; and
- a detecting circuit configured to detect incorrect ciphering if the value of the counter field is not equal to the number of padding bytes in the secured data field.

19. The electronic device according to claim 18, wherein the detecting circuit is configured to detect at least one bit in at least one of the padding bytes of the deciphered message as indicative of the incorrect ciphering.

20. The electronic device according to claim 19, wherein the detecting circuit is configured to detect the counter field which is not part of an interval defined by the algorithm as indicative of the incorrect ciphering.

21. The electronic device according to claim 19, wherein the algorithm is compatible with the Over The Air (OTA) standard.

22. The electronic device according to claim 19, wherein the algorithm includes at least one of a DES and AES algorithm.

23. The electronic device according to claim 19, wherein the receiving circuit, deciphering circuit, reading circuit, and detecting circuit are embodied as an IC Card circuit.

* * * * *

UNITED STATES PATENT AND TRADEMARK OFFICE
CERTIFICATE OF CORRECTION

| | |
|---|---|
| PATENT NO. | : 9,705,853 B2 |
| APPLICATION NO. | : 14/524132 |
| DATED | : July 11, 2017 |
| INVENTOR(S) | : Agostino Vanore |

It is certified that error appears in the above-identified patent and that said Letters Patent is hereby corrected as shown below:

On the Title Page

Item (73) Assignee, Line 1, delete "STMICOELECTRONICS S.R.L." and insert --STMICROELECTRONICS S.R.L.--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*

UNITED STATES PATENT AND TRADEMARK OFFICE
CERTIFICATE OF CORRECTION

PATENT NO. : 9,705,853 B2
APPLICATION NO. : 14/524132
DATED : July 11, 2017
INVENTOR(S) : Agostino Vanore It is certified that error appears in the above-identified patent and that said Letters Patent is hereby corrected as shown below:

On the Title Page

Item (72) Inventors, Line 2, delete "Distasio" and insert --Di Stasio--.

Signed and Sealed this
Seventeenth Day of March, 2020

Andrei Iancu
*Director of the United States Patent and Trademark Office*